May 5, 1925.  1,536,853

E. S. HITCHCOCK

REPAIR PART FOR WHEEL SCRAPERS

Filed Dec. 12, 1924

Everett S. Hitchcock

By

Attorney

Patented May 5, 1925.

1,536,853

UNITED STATES PATENT OFFICE.

EVERETT S. HITCHCOCK, OF RICHMOND, VIRGINIA, ASSIGNOR OF ONE-HALF TO ANGIER D. WOODS, OF HUDSON, NORTH CAROLINA.

REPAIR PART FOR WHEEL SCRAPERS.

Application filed December 12, 1924. Serial No. 755,516.

*To all whom it may concern:*

Be it known that I, EVERETT S. HITCHCOCK, a citizen of the United States, residing at Richmond, in the county of Henrico and State of Virginia, have invented certain new and useful Improvements in Repair Parts for Wheel Scrapers, of which the following is a specification.

In the use of wheel scrapers of the construction wherein the scraper pan is supported from the axle on the ends of a bail or fork pivoted to a bracket on the axle the constant strain and wear results in breakage of the arms of the bail at points adjacent to the fulcrum or point of attachment to the axle. The repair of such parts by the usual methods necessitates either welding a new extension to the arm of the bail which is broken, or the substitution of an entirely new bail, both of which methods are comparatively expensive. The purpose of my invention is to provide means for repairing such bails or forks in an expeditious and comparatively inexpensive manner. In carrying out this purpose, I provide a repair part which can be readily united with the broken arm of the bail in such a manner as to restore its original efficiency and by a method that can be practiced by anyone of ordinary mechanical skill even where a blacksmith is not available.

Figure 1:
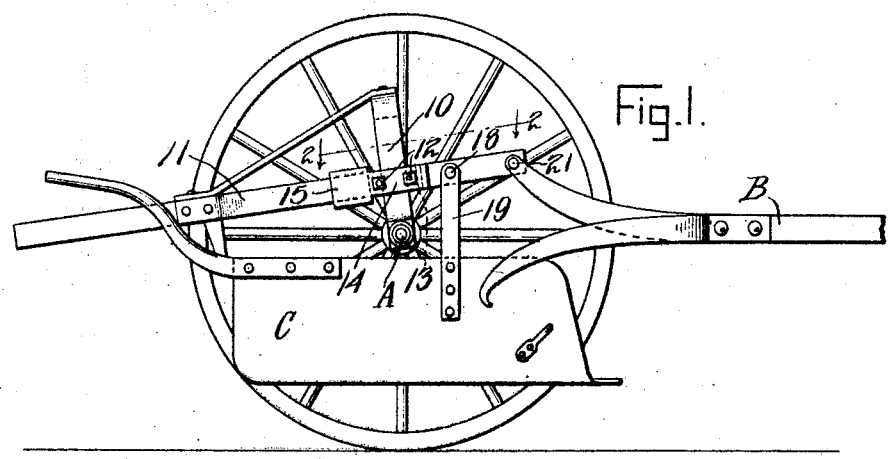
Figure 2:
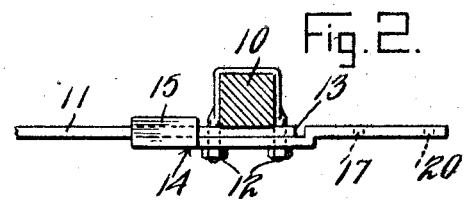

Referring to the drawings which are made a part hereof and on which similar reference characters indicate similar parts, Figure 1 is a side elevation of a scraper showing my repair part in use thereon;

Figure 2, a section on the dotted line 2—2 of Figure 1, and

Figure 3:
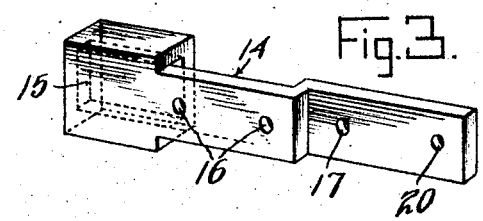

Figure 3, a detail perspective of the attachment.

In said drawings the portions marked A represent the axle of the wheel scraper, B the draft pole, and C the scraper pan, all of which parts are or may be of the usual or any approved construction and arrangement and require no detailed description herein.

The axle is bent to form a pair of uprights 10 located one adjacent to the wheel spindles on each end thereof and said axle pivots in the wheel boxes as usual. The arms of the bail 11 are secured to uprights 10 by bolts or a yoke 12.

When one of the arms of the bail 11 becomes worn or broken it is cut off by use of a cold-chisel, or other means, at a point 13 and an extension is then provided by means of my repair part 14, now to be described.

Said repair part consists of a bar having a socket 15 formed on one end adapted to receive the end of the bar 11 preferably after it is heated so that it will become slightly malleable and permit said socket to be driven thereon. Said part 14 is provided with apertures 16 to receive the bolts 12 for securing the bar to the uprights 10. The outer end of said repair part 14 extends forward to the same point as the original length of the broken arm of the fork or bail 11, and is provided with an aperture 17 through which pivot bolts 18 extend, to which the forward end of the scraper pan C is hung by means of links 19 and an aperture 20 through which passes a bolt 21 to which the draft pole B is connected.

In applying said repair part, the broken arm is cut off, as before stated, and the end of the part 14 carrying the socket 15 is then preferably heated by any means available until it is in a somewhat malleable condition (although this may not always be found necessary) and said part is then driven on over the end of said arm 11 until the apertures for the bolts 12 register with the apertures in the bracket 10 and in the end of said arm 11, and the bolts 12 are adjusted in place, thus making a very rigid and secure connection between said part 14 and the broken arm 11, and constituting an extension thereof which completely restores the original utility of said arm as well as its strength and operative efficiency. By this means the repair of the broken part is facilitated and the operation of the machine interrupted for only a comparatively short space of time and the necessity of taking such machine to a blacksmith shop for repair is obviated.

Having thus fully described my said invention, what I claim as new and desire to secure by Letters Patent, is:

1. In a wheel scraper a repair part for the supporting bail for the scraper pan comprising a bar formed on one end with a socket to receive one arm of the bail and having an off-set in line with said socket equal to the thickness of the bail arm and provided with apertures for securing bolts, substantially as set forth.

2. A repair part for the scraper pan supporting bail of wheel scrapers comprising, a body having a longitudinally disposed opening therethrough adapted to receive one end of a bail arm said body at one side of said opening having an extension of substantially the width of the opening and being offset in alinement with said opening to form a continuation of said bail arm when inserted in said socket, said offset portion being of a configuration corresponding to the forward portion of the bail arm, substantially as set forth.

In witness whereof, I have hereunto set my hand and seal at Washington, District of Columbia, this 15th day of November, A. D. nineteen hundred and twenty-four.

EVERETT S. HITCHCOCK. [L. S.]

Witnesses:
E. W. BRADFORD,
O. M. KEYS.